United States Patent
Kim et al.

(10) Patent No.: US 11,670,790 B2
(45) Date of Patent: Jun. 6, 2023

(54) FUEL CELL MEMBRANE ELECTRODE ASSEMBLIES

(71) Applicant: Robert Bosch GmbH, Stuttgart (DE)

(72) Inventors: Soo Kim, Cambridge, MA (US); Jonathan Mailoa, Cambridge, MA (US); Timothy Schultz, Sunnyvale, CA (US); Nathan Craig, Santa Clara, CA (US); Uma Krishnamoorthy, Cupertino, CA (US); Jake Christensen, Elk Grove, CA (US)

(73) Assignee: Robert Bosch GmbH, Stuttgart (DE)

( * ) Notice: Subject to any disclaimer, the term of this patent is extended or adjusted under 35 U.S.C. 154(b) by 239 days.

(21) Appl. No.: 16/694,305

(22) Filed: Nov. 25, 2019

(65) Prior Publication Data

US 2021/0159528 A1  May 27, 2021

(51) Int. Cl.
 *H01M 8/10* (2016.01)
 *H01M 8/1004* (2016.01)
 (Continued)

(52) U.S. Cl.
 CPC ....... *H01M 8/1004* (2013.01); *H01M 4/8605* (2013.01); *H01M 4/8652* (2013.01);
 (Continued)

(58) Field of Classification Search
 CPC ............. H01M 8/1004; H01M 8/1018; H01M 8/8605; H01M 8/8621; H01M 8/8652;
 (Continued)

(56) References Cited

U.S. PATENT DOCUMENTS 8,979,978 B2   3/2015  Miller et al.
9,680,158 B2   6/2017  Huang et al.
(Continued)

FOREIGN PATENT DOCUMENTS

KR   101675494 B1   11/2016
WO   2012114108 A1   8/2012
WO   2018231998 A1   12/2018

OTHER PUBLICATIONS

Gasteiger et al., "Activity benchmarks and requirements for Pt, Pt-alloy, and non-Pt oxygen reduction catalysts for PEMFCs", Nov. 5, 2004, New York, 27 pages.
(Continued)

*Primary Examiner* — Raymond Alejandro
(74) *Attorney, Agent, or Firm* — Brooks Kushman P.C.

(57) ABSTRACT

A fuel cell membrane electrode assembly including a polymer electrolyte membrane (PEM) and first and second electrodes. The PEM is situated between the first and second electrodes. The first electrode includes a first catalyst material layer including a first catalyst material and having first and second surfaces. The first electrode includes first and second material layers adjacent to the first and second surfaces, respectively, of the first catalyst material. The first material layer faces away from the PEM and the second material layer faces the PEM. The first material layer comprises a graphene-based material layer having a number of defects configured to mitigate dissolution of the first catalyst material through the first material layer.

20 Claims, 3 Drawing Sheets

(51) Int. Cl.
| | |
|---|---|
| *H01M 4/86* | (2006.01) |
| *H01M 4/92* | (2006.01) |
| *H01M 8/1039* | (2016.01) |
| *H01M 8/1041* | (2016.01) |
| *H01M 4/88* | (2006.01) |

(52) U.S. Cl.
CPC .......... *H01M 4/8825* (2013.01); *H01M 4/92* (2013.01); *H01M 8/1039* (2013.01); *H01M 8/1041* (2013.01); *H01M 2008/1095* (2013.01)

(58) Field of Classification Search
CPC ............. H01M 8/8647; H01M 8/8657; H01M 8/8825; H01M 8/92; H01M 8/921; H01M 8/1039; H01M 8/1041; H01M 2008/1095
See application file for complete search history.

(56) References Cited

U.S. PATENT DOCUMENTS

| | | | |
|---|---|---|---|
| 10,038,200 | B2 | 7/2018 | Kim et al. |
| 10,050,278 | B2 | 8/2018 | Yom et al. |
| 10,886,540 | B2 | 1/2021 | Xie et al. |
| 10,981,120 | B2 * | 4/2021 | Liu ..................... B01D 69/125 |
| 2012/0021131 | A1 | 1/2012 | Borsting et al. |
| 2012/0149897 | A1 | 6/2012 | Jeon et al. |
| 2013/0252138 | A1 | 9/2013 | Zhou et al. |
| 2015/0247258 | A1 | 9/2015 | Diankov et al. |
| 2015/0303487 | A1 | 10/2015 | Kamai et al. |
| 2016/0093891 | A1 | 3/2016 | Rehman et al. |
| 2016/0251765 | A1 | 9/2016 | Botte |
| 2017/0040082 | A1 | 2/2017 | Swett et al. |
| 2017/0065939 | A1 | 3/2017 | Kim et al. |
| 2017/0092960 | A1 | 3/2017 | Serov et al. |
| 2017/0170487 | A1 | 6/2017 | Xie et al. |
| 2017/0194656 | A1 | 7/2017 | Sinsabaugh et al. |
| 2017/0296982 | A1 | 10/2017 | Swett et al. |
| 2018/0062181 | A1 | 3/2018 | Gath et al. |
| 2018/0123140 | A1 | 5/2018 | Dai |
| 2018/0145328 | A1 | 5/2018 | Mullins et al. |
| 2018/0244524 | A1 | 8/2018 | Ozyilmaz et al. |
| 2018/0311624 | A1 | 11/2018 | Lozada et al. |
| 2018/0337411 | A1 | 11/2018 | Ozyilmaz et al. |
| 2019/0123359 | A1 * | 4/2019 | Morin ................. H01M 4/8626 |
| 2019/0280307 | A1 * | 9/2019 | Ramaswamy ....... H01M 4/8814 |
| 2020/0127279 | A1 * | 4/2020 | Roberts ................. C01B 32/194 |
| 2020/0127300 | A1 | 4/2020 | Prinz et al. |
| 2020/0147590 | A1 | 5/2020 | Imai et al. |
| 2020/0153004 | A1 | 5/2020 | Oh et al. |
| 2021/0057760 | A1 * | 2/2021 | Kim ..................... H01M 4/926 |

OTHER PUBLICATIONS

Schwammlein et al., "Anode Aging during PEMFC Start-Up and Shut-Down: H2-Air Fronts vs Voltage Cycles", Journal of the Electrochemical Society, Dec. 19, 2018, Germany, 11 pages.
Fampiou et al., "Binding of Pt Nanoclusters to Point Defects in Graphene: Adsorption, Morphology, and Electronic Structure", The Journal of Physical Chemistry, Feb. 26, 2012, Massachusetts, 13 pages.
Chen et al., "Comprehensive Enhancement of Nanostructured Lithium-Ion Batter Cathode Materials via Conformal Graphene Dispersion", Nano Letters, Feb. 27, 2017, Illinois, 8 pages.
Zaton et al., "Current understanding of chemical degradation mechanisms of perfluorosulfonic acid membranes and their mitigation strategies: a review", Royal Society of Chemistry, Mar. 13, 2017, France, 30 pages.
Groger et al., "Review—Electromobility: Batteries or Fuel Cells?", Journal of the Electrochemical Society, Oct. 9, 2015, Germany, 19 pages.
Wood et al., "First-Principles-Inspired Design Strategies for Graphene-Based Supercapacitor Electrodes" The Journal of Physical Chemistry, Dec. 13, 2013, California, 12 pages.
Niaei et al., "Hydrogenated defective graphene as an anode material for sodium and calcium ion batteries: A density functional theory study", Carbon, Apr. 18, 2018, Australia, 12 pages.
Dasgupta et al., "Atomic Layer Deposition of Platinum Catalysts on Nanowire Surfaces for Photoelectrochemical Water Reduction", Journal of the American Chemical Society, Aug. 20, 2013, California, 4 pages.
Chao et al., "Nanostructured Platinum Catalysts by Atomic-Layer Deposition for Solid-Oxide Fuel Cells", Advanced Energy Materials, May 15, 2012, California, 4 pages.
An et al., "Ultra-thin platinum catalytic electrodes fabricated by atomic layer deposition", Phys. Chem. Chem. Phys., Mar. 7, 2013, California, 6 pages.
Wu et al., "Core-shell graphene@amorphous carbon composites supported platinum catalysts for oxygen reduction reaction", Chinese Journal of Catalysis, Apr. 20, 2015, China, 6 pages.
M. Karuppannan, Y. Kim, S. Gok, E. Lee, J. Y. Hwang, J.-H. Jang, Y.-H. Cho, T. Lim, Y.-E. Sung and O. J. Kwon. "A highly durable carbon-nanofiber-supported Pt-C core-shell cathode catalyst for ultra-low Pt loading proton exchange membrane fuel cells: facile carbon encapsulation," Energy & Environmental Science, vol. 12, p. 2820, 2019, 10 pages.
L. Wang, Z. Sofer, and M. Pumera "Will any crap we put into graphene increase its electrocatalytic effect?," ACS Nano, vol. 14, No. 1, p. 21, 2020, 5 pages.
Jaber-Ansari et al., "Suppressing Manganese Dissolution from Lithium Manganese Oxide Spinel Cathodes with Single-Layer Graphene", Adv. Energy Mater. 2015, 5, 1500646, DOI: 10.1002/aenm.201500646, 10 pages.
T. X. Wu, G.Z. Wang, X. Zhang, C. Chen, Y.X. Zhang, and H.J. Zhao, "Transforming chitosan into N-doped graphitic carbon electrocatalysts," Chemical Communications, vol. 51, p. 1334, 2015, 4 pages.
J. Ying, G. Jiang, Z.P. Cano, L. Han, X.-Y. Yang, and Z. Chen, "Nitrogen-doped hollow porous carbon polyhedrons embedded with highly dispersed Pt nanoparticles as a highly efficient and stable hydrogen evolution electrocatalyst," Nano Energy, vol. 40, p. 88, 2017, 7 pages.
Z. Yan, H. Jin, and J. Guo. "Low-temperature synthesis of graphitic carbon-coated silicon anode materials," Carbon Energy, vol. 1, p. 246, 2019, 7 pages.
J.P. Paraknowitsch, J. Zhang, D. Su, A. Thomas, and M. Antonietti. "Ionic liquids as precursors for nitrogen-doped graphitic carbon," Advanced Materials, vol. 22, p. 87, 2010, 6 pages.
Zhang et al., "Tuning the Electrocatalytic Performance of Ionic Liquid Modified Pt Catalysts for the Oxygen Reduction Reaction via Cationic Chain Engineering", ACS Catal. 2018, 8, 8244-8254, 11 pages.
Aritonang et al., "Synthesis of Platinum Nanoparticles from K2PtCl4 Solution Using Bacterial Cellulose Matrix", Research Article, vol. 2014, Article ID 285954, 7 pages.
Liu et al., "In situ one-step synthesis of metal-organic framework encapsulated naked Pt nanoparticles without additional reductants", . Mater. Chem. A, 2015, 3, 8028, 6 pages.
Afsahi et al., "Electrocatalyst synthesized from metal organic frameworks", Journal of Power Sources 239 (2013), 9 pages.
Adlim et al., "Synthesis of chitosan-stabilized platinum and palladium nanoparticles and their hydrogenation activity", Journal of Molecular Catalysis A: Chemical 212 (2004), 9 pages.
Shearer et al., "Accurate thickness measurement of graphene," Nanotechnology, vol. 27, Feb. 18, 2016, pp. 1-10, DOI: 10.1088/0957-4484/27/12/125704.

* cited by examiner

FUEL CELL MEMBRANE ELECTRODE ASSEMBLIES

TECHNICAL FIELD

The present disclosure relates to fuel cell membrane electrode assemblies configured to mitigate catalyst dissolution while maintaining transportability of fuel cell reactants and products.

BACKGROUND

Fuel cells have shown promise as an alternative power source for vehicles and other transportation applications. Fuel cells operate with a renewable energy carrier, such as, hydrogen. Fuel cells also operate without toxic emissions or greenhouse gases. An individual fuel cell includes a membrane electrode assembly (MEA) and two flow field plates. An individual fuel cell typically delivers 0.5 to 1.0 V. Individual fuel cells can be stacked together to form a fuel cell stack having higher voltage and power. Due to the relatively high costs of the materials in the fuel cell stack, fuel cell technology has seen limited adoption. One of the materials that contributes significantly to the overall cost of the fuel cell stack is the catalyst material, such as platinum catalyst materials. The durability of the catalyst materials has an impact on the overall cost of fuel cell technology.

SUMMARY

According to one embodiment, a fuel cell membrane electrode assembly including a polymer electrolyte membrane (PEM) and first and second electrodes is disclosed. The PEM is situated between the first and second electrodes. The first electrode includes a first catalyst material layer including a first catalyst material and having first and second surfaces. The first electrode includes first and second material layers adjacent to the first and second surfaces, respectively, of the first catalyst material. The first material layer faces away from the PEM and the second material layer faces the PEM. The first material layer comprises a graphene-based material layer having several defects configured to mitigate dissolution of the first catalyst material through the first material layer.

According to another embodiment, a fuel cell membrane electrode assembly is disclosed. The fuel cell membrane electrode assembly includes a polymer electrolyte membrane (PEM) and first and second electrodes. The PEM is situated between the first and second electrodes. The first electrode includes a first catalyst material layer including a first catalyst material and having first and second surfaces. The first electrode includes first and second graphene-based material layers adjacent to the first and second surfaces, respectively, of the first catalyst material. The first graphene-based material layer faces away from the PEM and the second graphene-based material layer faces the PEM. The first graphene-based material layer has a first number of defects and the second graphene-based material layer has a second number of defects. The first number is greater than the second number.

According to yet another embodiment, a fuel cell membrane electrode assembly is disclosed. The fuel cell membrane electrode assembly includes a polymer electrolyte membrane (PEM) and first and second electrodes including first and second bulk materials. The PEM is situated between the first and second electrodes. The first bulk material includes a first number of catalyst units dispersed therein. Each of the catalyst units are comprised of a catalyst material layer including a catalyst material and having first and second surfaces and first and second material layers adjacent to the first and second surfaces, respectively, of the catalyst material layer. The first material layer of each catalyst unit is comprised of a graphene-based material layer having several defects configured to mitigate dissolution of the catalyst material through the graphene-based material layer.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for applications or implementations.

Except in the examples, or where otherwise expressly indicated, all numerical quantities in this description indicating amounts of material or conditions of reaction and/or use are to be understood as modified by the word "about" in describing the broadest scope of the invention. Practice within the numerical limits stated is generally preferred. Also, unless expressly stated to the contrary: percent, "parts of," and ratio values are by weight; the term "polymer" includes "oligomer," "copolymer," "terpolymer," and the like; the description of a group or class of materials as suitable or preferred for a given purpose in connection with the invention implies that mixtures of any two or more of the members of the group or class are equally suitable or preferred; molecular weights provided for any polymers refers to number average molecular weight; description of constituents in chemical terms refers to the constituents at the time of addition to any combination specified in the description, and does not necessarily preclude chemical interactions among the constituents of a mixture once mixed; the first definition of an acronym or other abbreviation applies to all subsequent uses herein of the same abbreviation and applies mutatis mutandis to normal grammatical variations of the initially defined abbreviation; and, unless expressly stated to the contrary, measurement of a property is determined by the same technique as previously or later referenced for the same property.

This invention is not limited to the specific embodiments and methods described below, as specific components and/or conditions may, of course, vary. Furthermore, the terminology used herein is used only for the purpose of describing embodiments of the present invention and is not intended to be limiting in any way.

As used in the specification and the appended claims, the singular form "a," "an," and "the" comprise plural referents unless the context clearly indicates otherwise. For example, reference to a component in the singular is intended to comprise a plurality of components.

The term "substantially" may be used herein to describe disclosed or claimed embodiments. The term "substantially" may modify a value or relative characteristic disclosed or claimed in the present disclosure. In such instances, "substantially" may signify that the value or relative characteristic it modifies is within ±0%, 0.1%, 0.5%, 1%, 2%, 3%, 4%, 5% or 10% of the value or relative characteristic.

Due to rising carbon dioxide emissions and the relatively high current dependency on non-renewable fossil fuels as energy carriers in the transportation sector, there is an ever increasing need to develop and commercialize transportation technologies that use clean and sustainable sources of energy. One technology that possesses promise is a fuel cell. A fuel cell uses oxygen from air and compressed hydrogen as fuel sources, while only emitting water and heat. The widespread adoption of fuel cells would reduce carbon dioxide emissions. However, widespread adoption requires further technological development. One area for further technological development is improvement of the durability of the catalyst materials in the fuel cell.

Catalyst materials are included in a catalyst layer of an anode and a cathode of a fuel cell. Platinum catalysts are commonly used as the catalyst materials for the anode and/or cathode. Platinum catalysts are subject to dissolution and migration of $Pt^{2+}$ ions from the catalyst layer to other components in the fuel cell, such as the polymer electrolyte membrane (PEM). One catalyst degradation pathway in a fuel cell involves Pt dissolution at high operating potential (e.g., greater than about 0.6, 0.7, and 0.8 volts versus a standard hydrogen electrode (SHE)). In another catalyst degradation pathway, a fuel cell reaches an even greater potential that 0.8 volts (e.g., up to about 2 volts). This may occur due to non-steady operation, carbon corrosion and/or gas starvation during start-up and shutdown, where degradation of the catalyst and other fuel cell components may accelerate. When the electrochemically-active surface area (ECSA) of a fuel cell catalyst is gradually reduced, a substantial decrease in oxygen reduction (ORR) activity may occur. Furthermore, dissolved catalyst metal ions may migrate toward other fuel cell components, for example, the polymer electrolyte membrane (PEM), potentially accelerating PEM degradations.

What is needed is a solution to reduce dissolution and to slow down migration while maintaining the beneficial catalytic activity of the platinum catalyst. Aspects of the present disclosure are directed to the use of defective graphene-based materials as part of an electrode to increase the durability, e.g. reduce dissolution and slow down migration, of catalyst materials. Aspects of the present disclosure use hybrid graphene-catalyst systems via controlled atomic and molecular interfaces to suppress metal dissolution of catalysts in PEM fuel cell environments. The use of defective graphene-based materials preserves electrochemical surface active area (ESCA) and/or mitigates PEM degradation, thereby extending the lifetime of the fuel cell stack for a given catalyst material loading.

Figure 1:
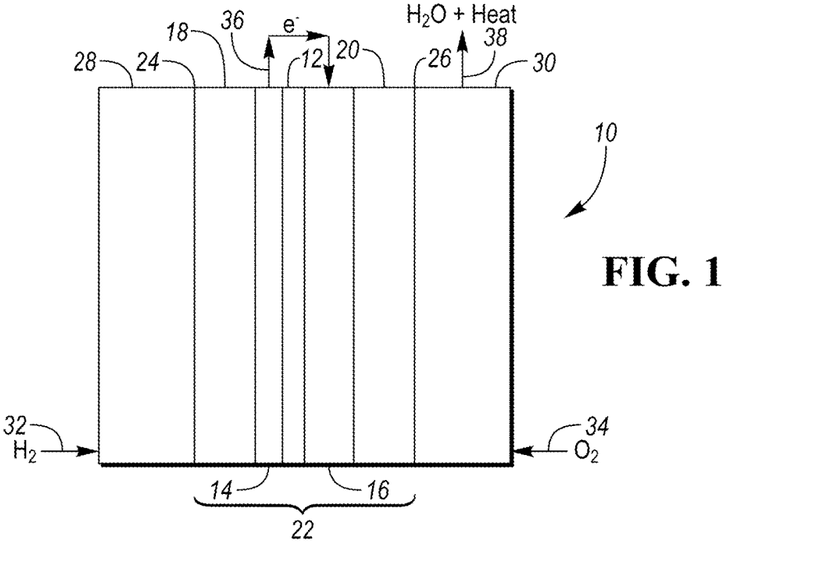
FIG. 1 depicts a schematic, side view of a fuel cell.

FIG. 1 depicts a schematic, side view of fuel cell 10. Fuel cell 10 can be stacked to create a fuel cell stack. Fuel cell 10 includes polymer electrolyte membrane (PEM) 12, anode 14, cathode 16 and first and second gas diffusion layers (GDLs) 18 and 20. PEM 12 is situated between anode 14 and cathode 16. Anode 14 is situated between first GDL 18 and PEM 12 and cathode 16 is situated between second GDL 20 and PEM 12. PEM 12, anode 14, cathode 16 and first and second GDLs 18 and 20 comprise membrane electrode assembly (MEA) 22. First and second sides 24 and 26 of MEA 22 is bounded by flow fields 28 and 30, respectively. Flow field 28 supplies $H_2$ to MEA 22, as signified by arrow 32. Flow field 30 supplies $O_2$ to MEA 22, as signified by arrow 34. A catalyst material, such as platinum, is used in anode 14 and cathode 16. The catalyst material is commonly the most expensive constituent of MEA 22.

Figure 2:
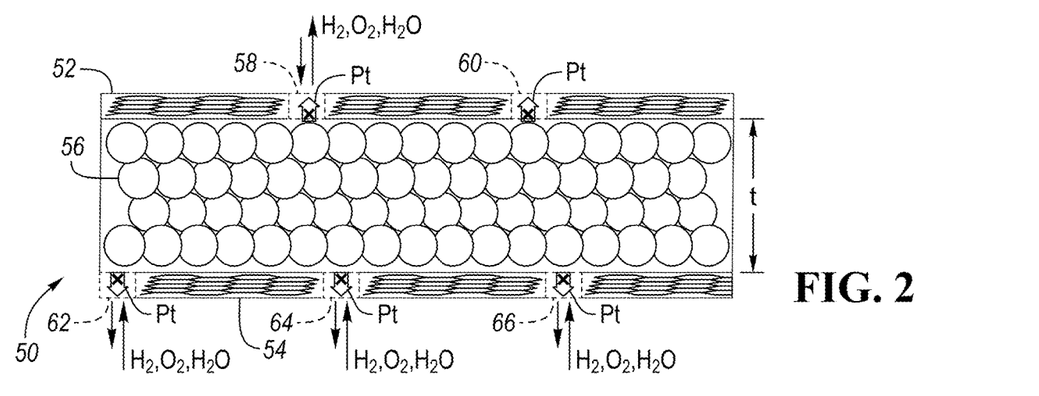
FIG. 2 depicts a schematic, side view of an electrode configured to be used as a cathode and/or an anode of a fuel cell.

FIG. 2 depicts a schematic, side view of electrode 50 configured to be used as anode 14 and/or cathode 16 of fuel cell 10. Electrode 50 includes first and second graphene-based material layers 52 and 54 and catalyst material layer 56. Catalyst material layer 56 is situated between first and second graphene-based material layers 52 and 54. At least one of the surfaces of catalyst material layer 56 may be partially or fully coated with the graphene-based material.

The graphene-based material of layers 52 and 54 may include graphene, graphene oxide (GO), reduced graphene oxides (rGO) and combinations thereof. The graphene-based material may also include other materials that capture dissolved metal ions in the operation of fuel cell 10. The graphene-based material may contain oxygen functional groups such as epoxy (—O—), carbonyl (═O), carboxylic (—COOH), and/or hydroxyl (—OH) to further optimize the transport and diffusion of Pt, $H_2$, $O_2$, and $H_2O$. In one embodiment, different graphene and graphene oxides can be obtained by Hummer's method. The graphene-based material may include a significant amount of material capable of capturing dissolved metal ions. The significant amount may be any of the following values or in a range of any two of the following values: 70, 75, 80, 85, 90, 95 and 100%. The remaining amounts may partially include an amorphous and/or crystalline graphene material. In one embodiment, first and/or second graphene-based material layers 52 and 54 may include more crystalline graphene material than amorphous graphene material. Crystalline graphene material is a $sp^2$-type carbon that is less corrsosive during strat-up/shutdown during operaiton of fuel cell 10 compared to an amorphous carbon that is primaily a $sp^3$-type carbon. The graphene-based material may be further functionalized by cation or anion doping. In another embodiment, the graphene-based material may include a carbide material, a nitride material or a fluoride material configured to optimize the selective diffusion of Pt, $H_2$, $O_2$ and $H_2O$. The graphene-based material coating may also present a physical barrier against HF and/or or $SO_3^-$ attack to further prevent PEMFC degradation.

In another embodiment, the graphene-based material may be composed of a single layer or between two and five layers of sp²-type carbon atoms. Amorphous carbon, e.g., sp³-type, may be also present. The ratio of sp²-type carbon atoms to sp³-type carbon atoms may be based on the operating conditions of the fuel cell.

The graphene-based material may be a graphene sheet applied in a planar orientation. The graphene-based sheet may include a single monolayer of graphene. In other embodiments, the number of graphene monolayers in the graphene-based sheet may be any of the following numbers or in a range of any two of the following numbers: 2, 3, 4, 5, 6, 7, 8, 9, 10, 11, 12, 13, 14 and 15. The graphene-based material may be configured to mitigate degradation of the catalyst material in electrode 50. Mitigation of Pt degradation may provide one or more of the following benefits: (1) reduce ECSA loss, and (2) prevent $Pt^{2+}$ ion migration to the interface between PEM 12 and electrode 50 or into PEM 12, thereby suppressing PEM degradation.

The addition of the graphene-based material may enhance electron transport due to increased conductivity of the catalyst layer. In one embodiment, first and second graphene-based material layers 52 and 54 may be in direct contact with catalyst material layer 56. In another embodiment, first and second graphene-based material layers 52 and 54 are loosely bound, e.g., located a short distance from catalyst material layer 56. The short distance may be any of the following values or in a range of any two of the following values: 0.5, 1.0, 1.5, 2.0, 2.5, 3.0, 4.0 and 10 nm. When Pt ionizes to $Pt^{2+}_{(aq.)}$ and dissolves into solution, the graphene-based material coating may capture the dissolved Pt species.

The graphene-based material may be coated onto one or both surfaces of catalyst material layer 56 using various processes. The graphene-based material may be deposited onto catalyst material layer 56 during synthesis of electrode 50, or after fabrication of electrode 50, either in the form of thin film or via dispersion (e.g., using graphene ink). The graphene may be in the form of sheets, flakes, powders and/or combinations thereof. A coated electrode may be produced using solid-state, solution-based or deposition techniques, followed by secondary heat treatment in the presence of oxidizing or reducing agents (e.g., air, $O_2$, $N_2$, Ar, $H_2$ or mixtures thereof). A film of the graphene-based material may be grown on a metal foil using chemical vapor deposition (CVD), followed by cleaning with an organic solvent and electro-polishing with applied voltage with acids. Thereafter, the material may be rinsed and heat-treated in a furnace under a reducing environment (e.g., using Ar:$H_2$ gas mixture) for graphene growth. After the CVD growth, the sample may be combined with a polymer (e.g., poly(methyl methacrylate) (PMMA)), followed by an etching or rinsing process. The composite film may be transferred onto catalyst material layer 56.

In another embodiment, a single or few layer graphene films may be grown on thick metal substrates in addition to metal foils. Graphene films may have mechanical support provided by adding a polymer film layer on the graphene using spin, dip, or other coating processes. The graphene/polymer film stack may be removed from the metal substrate using an electrochemical bath wet process and may be transferred to a catalyst substrate. Once the graphene/polymer film stack is applied to the catalyst substrate the polymer support may be removed by wet chemistry or a dry plasma etch process. Cleaning process may be needed before the graphene deposition onto the metal substrate. Additional cleaning process may be necessary after the polymer removal to obtain high quality graphene-metal catalyst composites. For the transferring process, the smoothness and crystallinity of the starting metal substrate will determine the expected graphene defect levels. After the transfer process is completed, the roughness of the underlying catalyst metals (e.g., nanoparticles) will be a primary contributor to the final graphene defect level.

In one embodiment, the shape of the graphene-based material follows the contour of the surface of the catalyst material layer, for example, the roughness of platinum nanoparticles. The amount of graphene-based material defects, the shape of graphene-based material wrinkling, and the shape of the interface between first and/or second graphene-based material layers 52 and 54 and catalyst material layer 56 may lead to different surface morphology depending on the surface roughness of catalyst material layer 56. Depending on the number of defects, graphene-based material layer shape, and interface shape, wrinkling and/or graphene defect populations, several activation cycles may be carried out to enable proper diffusion and relatively fast transport of $H_2$, $O_2$, and $H_2O$ to reach the desired oxygen reduction reaction (ORR) activity.

Other two-dimensional layered structured materials may be coated onto a surface of catalyst material layer 56 using various processes. Non-limiting examples of other two-dimensional layered structured material include graphyne, borophene, germanene, silicone, $Si_2BN$, stanine, phosphorene, bismuthene, molybdenite, as well as transition metal dichalcogenides (TMDCs) (e.g., $MOS_2$, $WSe_2$, $HfS_2$, etc.), layered transition metal carbides and carbonitrides (MXenes) with a general formula of $M_{n+1}X_nT_x$, where M stands for transition metals (e.g., Ti, Mo, W, Nb, Zr, Hf, V, Cr, Ta, and Sc), X stands for carbon and/or nitrogen, and $T_x$ stands for surface terminations (e.g., =O, —OH or —F), and combinations thereof. Other two-dimensional layered structural materials may be used to replace in whole or in part of the graphene-based materials in the electrode catalyst layer coating.

The catalyst material of layer 56 may be pure Pt, a Pt-M alloy (where M is another metal from the periodic table), other platinum group members (PGM) metals (e.g., Ru, Rh, Pd, Os or Ir), Ag, Au, Cu, Fe, Mn, Ni, Co, W, Mo, Sn, Ti, PGM-M, Pt-PGM-M or combinations or alloys thereof. The thickness of catalyst material layer 56 may vary depending on the required catalyst loadings for satisfying different fuel cell specification and/or size. The thickness (t) as depicted on FIG. 2 of metal catalyst layer may be any of the following values or in a range of any two of the following values: 1, 2, 3, 4, 5, 6, 7, 8, 9, 10 and 20 nm. The catalyst material of layer 56 may be a nano-structured catalyst material, thereby providing increased accessible electrochemically active surface area (ECSA). The increased ECSA produces a higher catalytic per unit mass of catalyst material being used.

First graphene-based material layer 52 includes defects 58 and 60. Second graphene-based material layer 54 includes defects 62, 64 and 66. Defects 58, 60, 62, 64 and/or 66 may be configured (1) to capture dissolved metal ions (e.g., $Pt^{2+}_{(aq.)}$ ions) from catalyst material layer 56, and/or (2) to provide a diffusion path (e.g., channel) for fuel cell reactants (e.g., $H_2$, $O_2$, and/or $H_2O$). Defects 58, 60, 62, 64 and/or 66 may significantly enhance the weak binding energies in pristine graphene.

Non-limiting examples of defects include mono-vacancy (MV), di-vacancy (DV), tri-vacancy (TV), quad-vacancy (QV), graphene holes, Stone-Wales (SW) defects, and/or commonly-found oxygen functional groups such as hydroxide (—OH), epoxy (—O—), carbonyl (=O), and/or carboxylic (—COOH) groups. Non-limiting examples of methods for producing such defects include synthetic methods, annealing processes and ion bombardment. In another embodiment, graphene defects may be a hole. Removal of more carbon atoms (e.g., creating larger vacancies) may be accomplished to rearrange the defective graphene structure.

The number of defects per unit volume of either first or second graphene-based material layer may be any of the following values or in a range of any two of the following values: 0.5, 1, 2, 3, 4, 5, 6, 7, 8, 9, 10, 11, 12 and 13%. The number of defects per unit volume may vary depending on lifetime requirements and/or operating conditions for fuel cell 10. As a non-limiting example, if fuel cell 10 is required to operate at a relatively high potential above about 0.6, 0.7 or 0.8 $V_{RHE}$ (or any other non-steady state condition leading to an abrupt increase in the potential of the fuel cell), more defects may be necessary to capture dissolved metal ions from catalyst material layer 56 during degradation. Moving back to FIG. 1, first and/or second graphene-based material layer 52 and 54 may have different selectivities among metal ions, $H_2$, $O_2$, and $H_2O$. In one embodiment, second graphene-based material layer 54 may be a support material for catalyst material layer 56 and first graphene-based material layer 52 may be configured to capture dissolved metal ions and/or to provide a diffusion path (e.g., channel) for fuel cell reactants. In this embodiment, less defects may be needed in second graphene-based material layer 54 than in first graphene-based material layer 52.

Figure 3:
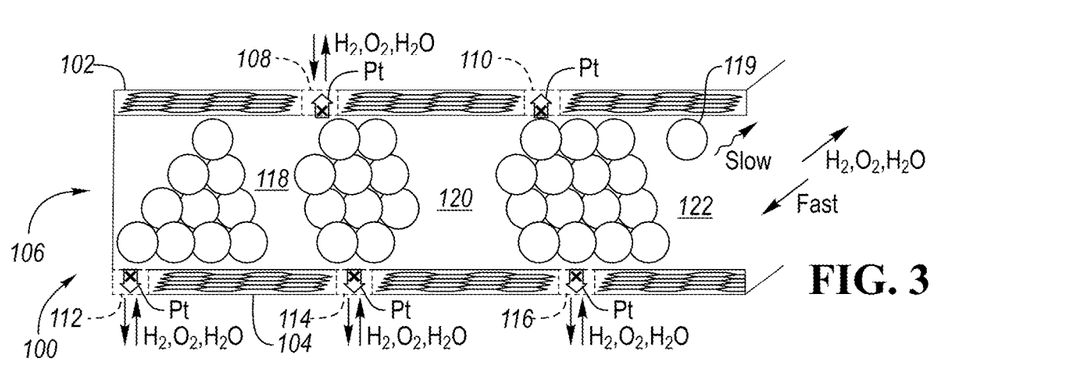
FIG. 3 depicts a schematic, side view of an electrode configured to be used as a cathode and/or an anode of a fuel cell.

FIG. 3 depicts a schematic, side view of electrode 100 configured to be used as anode 14 and/or cathode 16 of fuel cell 10. Electrode 100 includes first and second graphene-based material layers 102 and 104 and catalyst material layer 106. Catalyst material layer 106 is situated between first and second graphene-based material layers 102 and 104. First graphene-based material layer 102 includes defects 108 and 110. Second graphene-base material layer 104 includes defects 112, 114 and 116. Defects 108, 110, 112, 114 and/or 116 may be configured (1) to capture dissolved metal ions (e.g., $Pt^{2+}_{(aq.)}$ ions) from catalyst material layer 56, and/or (2) to provide a diffusion path (e.g., channel) for fuel cell reactants (e.g., $H_2$, $O_2$, and/or $H_2O$). The thickness (t) as depicted on FIG. 3 of metal catalyst layer may be any of the following values or in a range of any two of the following values: 1, 2, 3, 4, 5, 6, 7, 8, 9, 10 and 20 nm.

Catalyst material layer 106 has a reduced catalyst loading relative to catalyst material layer 56, thereby introducing void spaces within catalyst material layer 106, such as void spaces 118, 120 and 122 as shown in FIG. 3. In one embodiment, the voids may be formed by the surface tension between metal catalyst nanoparticles. In another embodiment, the graphene-based material may be homogenized in a homogenizer at relatively high RPMs. Relatively larger voids may be formed, as shown in FIG. 3. The volume of each void space may be independently selected from any of the following values or in a range of any two of the following values: 1 $nm^3$, 50 $nm^3$, 100 $nm^3$, 200 $nm^3$, 500 $nm^3$, 750 $nm^3$ and 1 $\mu m^3$. The percentage of void space to volume occupied by catalyst materials may be any of the following values or in a range of any two of the following values: 25%, 30%, 40%, 50% and 60%.

In one or more embodiments, one or more of the void spaces provide a diffusion path (e.g., channel) for fuel cell reactants (e.g., $H_2$, $O_2$, and/or $H_2O$). The void spaces may permit metal catalyst re-deposition. The void spaces may also shape the interface between catalyst material layer 106 and first and second graphene-based material layers 102 and 104 with decreased interfacial resistance. Due to the void spaces, the first and second graphene-based material layers 102 and 104 may wrinkle (e.g., change the shape of the graphene-based material layers in a region above or below a void space) after a certain number of fuel cell operations. The number of operations may be any of the following values or in a range of any two of the following values: 2,000, 2,500, 3,000, 3,500 and 4,000. In one embodiment, one or more of the void spaces may be filled with one or more conducting agents other than the catalyst material. The other conducting agents may include amorphous carbon black and/or conductive polymers.

Electrode 100 also includes first and second openings. The openings may be configured to provide a diffusion path (e.g., channel) for fuel cell reactants (e.g., $H_2$, $O_2$, and/or $H_2O$). Some catalyst material in the form of dissolved metal ions may be lost through one or more of first and second openings while operating fuel cell 10 at a relatively high potential. However, in general, the diffusion of metal ions (e.g., $Pt^{2+}$) is relatively much slower due to attractive forced between the dissolved metal ions and first and second graphene-based material layers 102 and 104, as depicted by dissolved metal ion 119.

Electrodes 50 and/or 100 may be utilized as a thin film-type electrode where the one or more graphene-base materials are transferred or deposited directly onto a Pt thin catalyst film. Non-limiting examples of the application of this type of thin-film configurations include mobile, small power electronics, military and/or aerospace applications.

Figure 4:
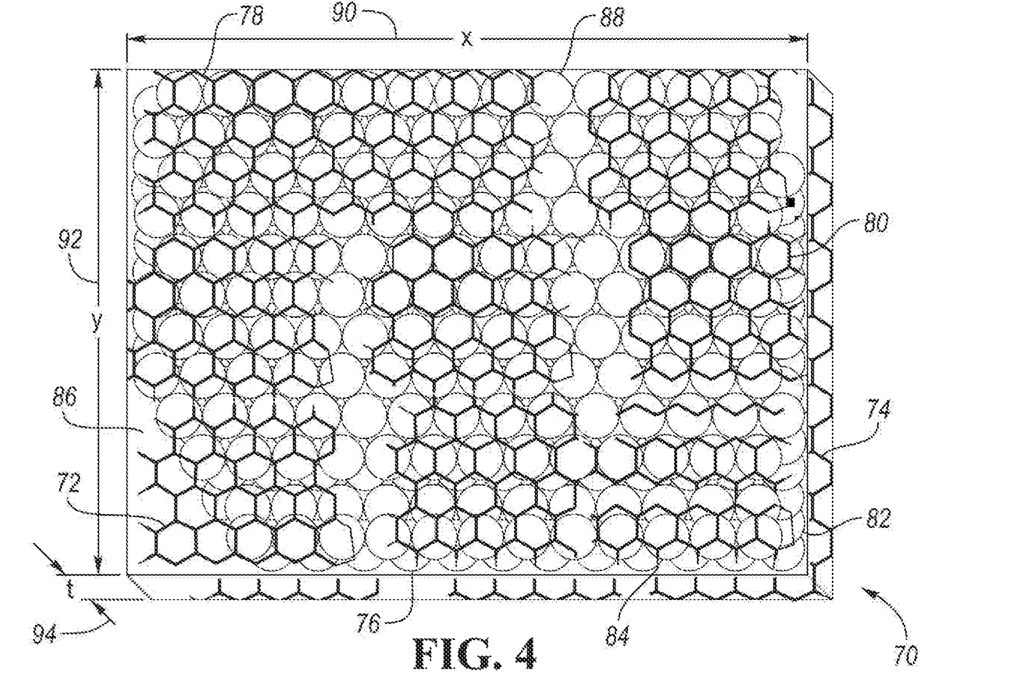
FIG. 4 depicts a schematic, top view of a catalyst unit configured to be used in a cathode and/or an anode of a fuel cell.

FIG. 4 depicts a schematic, top view of catalyst unit 70 configured to be used in anode 14 and/or cathode 16 of fuel cell 10. Catalyst unit 70 includes first and second graphene-based material layers 72 and 74 and catalyst material layer 76. Catalyst material layer 76 is situated between first and second graphene-based material layers 72 and 74. First graphene-based material layer 72 includes regularly repeating graphene-based materials, such as regions 78 and 80. Shaded regions, such as regions 82 and 84, depict the formation of graphene-based defects based on oxygen functionalized groups (e.g., —O—, =O, —COOH, and —OH). Regions not including regularly repeating graphene-based materials or graphene-based defects based on oxygen funcitonalized groups are void spaces, such as void spaces 86 and 88. The void spaces may be vacancies and/or graphene holes.

As shown in FIG. 4, catalyst unit 70 has width 90, length 92 and thickness 94. Each of width 90, length 92 and thickness 94 may independently vary based on the specification of the PEMFC (e.g., stack size, power requirement, operating scheme, etc.). Width 90 may be any of the following values or in a range of any two of the following values: 10 nm, 100 nm, 1 µm, 10 µm and 100 µm. Length 92 may be any of the following values or in a range of any two of the following values: 10 nm, 100 nm, 1 µm, 10 µm and 100 µm. Thickness 94 may be any of the following values or in a range of any two of the following values: 1, 2, 3, 4, 5, 6, 7, 8, 9, 10 and 20 nm.

Figure 5:
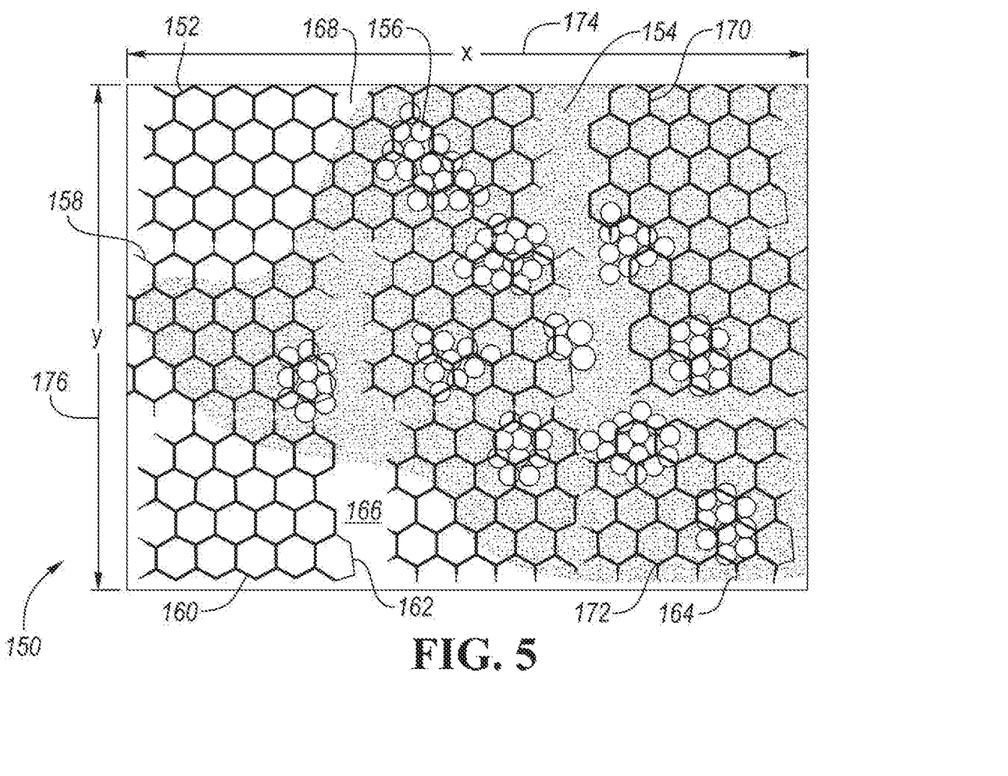
FIG. 5 depicts a schematic, top perspective view of a catalyst unit configured to be used in a cathode and/or an anode of a fuel cell.

FIG. 5 depicts a schematic, top perspective view of catalyst unit 150 configured to be used in anode 14 and/or cathode 16 of fuel cell 10. Catalyst unit 150 includes graphene-based material layer 152 and catalyst support material layer 154. Catalyst material layer 156 is situated between graphene-based material layer 152 and catalyst support material layer 154. Graphene-based material layer 152 includes regularly repeating graphene-based materials, such as regions 158 and 160. Shaded regions, such as regions 162 and 164, depict the formation of graphene-based defects based on oxygen functionalized groups (e.g., —O—, =O, —COOH, and —OH). Regions not including regurly repeating graphene-based materials or graphene-based defects based on oxygen functionalized groups are void spaces, such as void spaces 166 and 168. The void spaces may be vacancies and/or graphene holes. The certain percentage may be any of the following values or in a range of any two of the following values: 5%, 10%, 15%, 20% and 25%.

Catalyst support material layer 154 may be formed of an amorphous carbon material (e.g., sp$^3$-type carbon), one or more metal oxides (e.g., MOx, where M=Ti, Sn, W, Mo, Ge, Ta, etc.), or combinations thereof. Catalyst support material layer 154 may be closer to PEM 12 than graphene-based material layer 152. In another embodiment, catalyst support material layer 154 may be sandwiched between first and second graphene-based material layers and the outer surface of the graphene-based material is contacted by a catalyst support material layer 154.

As shown in FIG. 5, catalyst material layer includes void spaces, such as void spaces 170 and 172. In one or more embodiments, one or more of the void spaces provide a diffusion path (e.g., channel) for fuel cell reactants (e.g., $H_2$, $O_2$, and/or $H_2O$). The void spaces may also shape the interface between catalyst material layer 106 and first and second graphene-based material layers 152 and 154 with decreased interfacial resistance. Due to the void spaces, the first and second graphene-based material layers 152 and 154 may wrinkle (e.g., changing the shape of the graphene-based material layers in a region above or below a void space) after a certain number of fuel cell operations. The number of operations may be any of the following values or in a range of any two of the following values: 2,000, 2,500, 3,000, 3,500 and 4,000. In one embodiment, one or more of the void spaces may be filled with one or more conducting agents other than the catalyst material. The other conducting agents may include amorphous carbon black and/or conductive polymers.

As shown in FIG. 5, catalyst unit 150 has width 174 and length 176, and a thickness (not shown). Each of width 174, length 176 and thickness may independently vary based on the specification of the PEMFC (e.g., stack size, power requirement, operating scheme, etc.). Width 174 may be any of the following values or in a range of any two of the following values: 10 nm, 100 nm, 1 μm, 10 μm and 100 μm. Length 176 may be any of the following values or in a range of any two of the following values: 10 nm, 100 nm, 1 μm, 10 μm and 100 μm. Thickness may be any of the following values or in a range of any two of the following values: 1, 2, 3, 4, 5, 6, 7, 8, 9, 10 and 20 nm.

Electrodes 50 and/or 100 and catalyst units 70 and 150 may be fabricated using a chemical synthesis process and subsequently processed into a desired shape and size. Non-limiting examples of suitable chemical synthesis processes include focus ion beam scanning electrode microscope (FIB-SEM), e-beam lithography, laser write and photo-lithography. In other embodiments, the catalyst configuration may be formed by using a solution-type or deposition process until a desired size and shape is obtained. Regarding the subsequent shaping and sizing steps, the catalyst configuration may be formed into a square, a nanowire or a strip. The square shape may have sides of any of the following values or in a range of any two of the following values: 10 nm, 100 nm, 1 μm, 10 μm and 100 μm. The width of the strip may be any of the following values or in a range of any two of the following values: 1, 2, 5, 10 or 15 μm.

Figure 6:
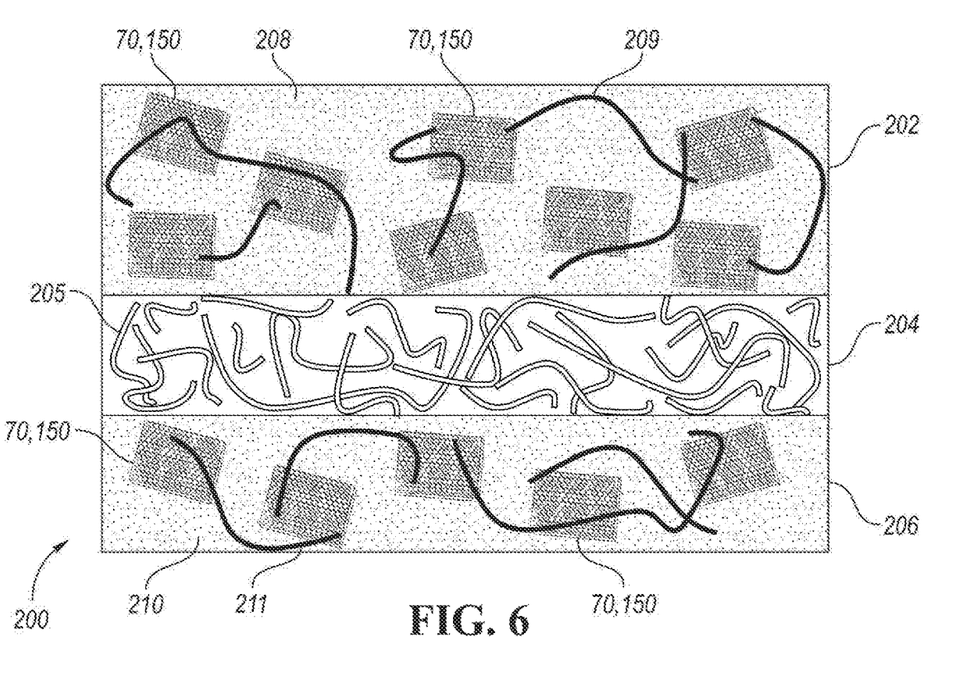
FIG. 6 depicts a schematic, side view of a membrane electrode assembly configured to be used in a fuel cell.

FIG. 6 depicts a schematic, side view of MEA 200 configured to be used in a fuel cell, such as fuel cell 10. MEA 200 includes cathode 202, PEM 204 and anode 206. PEM 204 is situated between cathode 202 and anode 206. PEM 204 is formed an ionomer that forms ionomer network 205. PEM 204 is configured to conduct protons while providing electronic insulator and a barrier between fuel cell reactants (e.g., oxygen and hydrogen gas). The ionomer may be based on perfluorosulfonic acid. One non-limiting example is Nafion available from the DuPont Company.

Cathode 202 includes cathode bulk material 208. Catalyst units 70 and/or 150 may be dispersed within cathode bulk material 208. As shown in FIG. 6, cathode bulk material 208 is an ionomer that forms ionomer network 209 between catalyst units 70 and/or 150. Anode 206 includes anode bulk material 210. Catalyst units 70 and/or 150 may be dispersed within anode bulk material 210. As shown in FIG. 6, anode bulk material 210 is an ionomer that forms ionomer network 211 between catalyst units 70 and/or 150.

Anode and/or cathode 202 and 206 may be formed by mixing catalyst units 70 and/or 150 with one or more ionomers. The catalyst units 70 and/or 150 may be mixed using a solution-type of media, e.g., a slurry in a homogenizer.

The loading of catalyst units 70 and/or 150 in cathode 202 and anode 206 may be independently selected based on operating conditions of the fuel cell. In one embodiment, the loading of catalyst units 70 and/or 150 in cathode 202 is higher than in anode 206 to overcome the ORR kinetics. The ratio of cathode loading to anode loading may be any of the following values or in a range of any two of the following values: 2:1, 7:4, 3:2, 5:4 and 1:1.

As described above, each of electrodes 50 and 100 and catalyst units 70 and 150 includes at least one graphene-based layer having defects. The size, type and density of the defects may be controlled depending on fuel cell operation conditions (e.g., operating voltage and lifetime). In one embodiment applied under high power conditions, more graphene-based defects may be present than under low power conditions to capture more catalyst material and/or metal ions dissolved at high potential (e.g., greater than about 0.6, 0.7 and 0.8 $V_{RHE}$).

Figure 7:
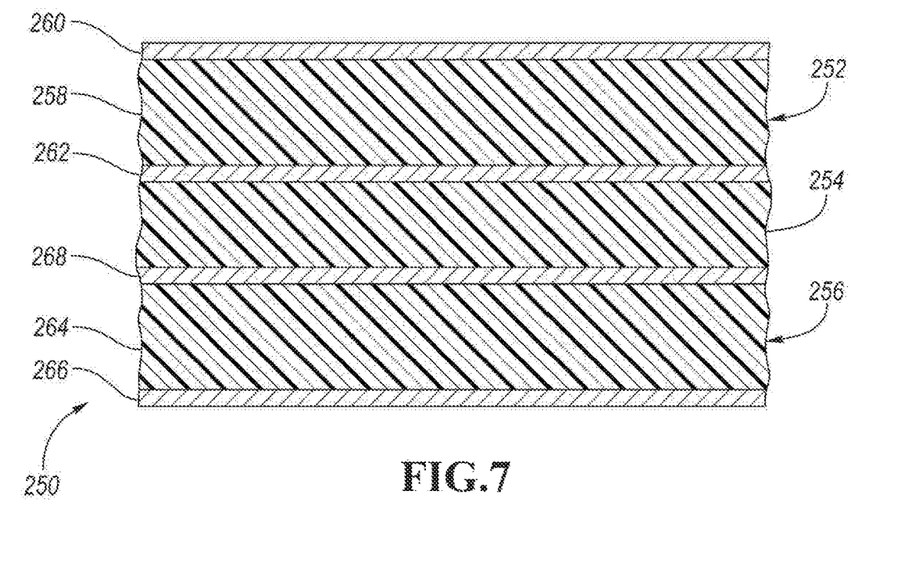
FIG. 7 depicts a schematic, side view of a membrane electrode assembly configured to be used in a fuel cell.

FIG. 7 depicts a schematic, cross section view of MEA 250 configured to be used in a fuel cell, such as fuel cell 10. MEA 250 includes cathode 252, PEM 254 and anode 256. Cathode 252 includes catalyst material layer 258, which is disposed between first and second material layers 260 and 262. First material layer 260 faces away from PEM 254 and second material layer 262 faces toward PEM 254. In one embodiment, first material layer 260 is first graphene-based material layer 52 or 108 configured to (1) to capture dissolved metal ions (e.g., $Pt^{2+}_{(aq.)}$ ions) from catalyst material layer 56, and/or (2) to provide a diffusion path (e.g., channel) for fuel cell reactants (e.g., $H_2$, $O_2$, and/or $H_2O$) and second carbon-based layer 262 is formed of a support material, such as an amorphous carbon material (e.g., sp$^3$-type carbon), one or more metal oxides (e.g., MOx, where M=Ti, Sn, W, Mo, Ge, Ta, etc.), or combinations thereof.

Anode 256 includes catalyst material layer 264, which is disposed between first and second material layers 266 and 268. First material layer 266 faces away from PEM 254 and second carbon-based material layer 268 faces toward PEM 254. In one embodiment, first material layer 266 is first graphene-based material layer 52 or 108 configured to (1) to capture dissolved metal ions (e.g., $Pt^{2+}_{(aq.)}$ ions) from catalyst material layer 56, and/or (2) to provide a diffusion path (e.g., channel) for fuel cell reactants (e.g., $H_2$, $O_2$, and/or $H_2O$) and second material layer 268 is formed of a support material, such as an amorphous carbon material (e.g., sp$^3$-type carbon), one or more metal oxides (e.g., MOx, where M=Ti, Sn, W, Mo, Ge, Ta, etc.), or combinations thereof.

The following application is related to the present application: U.S. patent application Ser. No. 16/544,511, filed on Aug. 19, 2019, and issued as U.S. Pat. No. 11,145,875 on Oct. 12, 2021, which is incorporated by reference in its entirety herein.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

What is claimed is:

1. A fuel cell membrane electrode assembly comprising:
a polymer electrolyte membrane; and
first and second electrodes, the polymer electrolyte membrane situated between the first and second electrodes, the first electrode including a first catalyst material layer including a first catalyst material and having first and second surfaces, the first electrode including first and second material layers adjacent to the first and second surfaces, respectively, of the first catalyst material layer, the first material layer facing away from the polymer electrolyte membrane and the second material layer facing the polymer electrolyte membrane, the first material layer comprised of a first graphene-based material layer having a first number of defects configured to mitigate dissolution of the first catalyst material through the first material layer, the first catalyst layer including a number of clusters of the first catalyst material, and the number of clusters defining a number of void spaces therebetween having a volume of 1 nm$^3$ to 1 μm$^3$.

2. The fuel cell membrane electrode assembly of claim 1, wherein the second material layer is comprised of a second graphene-based material layer having a second number of defects configured to mitigate dissolution of the first catalyst material through the second material layer.

3. The fuel cell membrane electrode assembly of claim 1, wherein the first and/or second material layers are first and/or second thin films, respectively.

4. The fuel cell membrane electrode assembly of claim 1, wherein the first catalyst material includes pure Pt; a Pt-M alloy where M is a metal other than Pt; a platinum group member metal; an alloy of a platinum group member metal and a metal other than Pt; an alloy of platinum, a platinum group member metal, and a metal other than Pt; or combinations thereof.

5. The fuel cell membrane electrode assembly of claim 1, wherein the number of void spaces configured to change a shape of the first material layer comprised of the graphene-based material layer over a number of operating cycles of a fuel cell containing the fuel cell membrane electrode assembly.

6. The fuel cell membrane electrode assembly of claim 1, wherein the graphene-based material layer includes graphene, graphene oxide, reduced graphene oxides or combinations thereof.

7. The fuel cell membrane electrode assembly of claim 1, wherein the second material layer is a catalyst support layer configured to support the first catalyst material layer.

8. The fuel cell membrane electrode assembly of claim 1, wherein the first number of defects per unit volume of the first graphene-based material layer is 0.5 to 13%.

9. A fuel cell membrane electrode assembly comprising:
a polymer electrolyte membrane; and
first and second electrodes, the polymer electrolyte membrane situated between the first and second electrodes, the first electrode including a first catalyst material layer including a first catalyst material and having first and second surfaces, the first electrode including first and second graphene-based material layers adjacent to the first and second surfaces, respectively, of the first catalyst material, the first graphene-based material layer facing away from the polymer electrolyte membrane and the second graphene-based material layer facing the polymer electrolyte membrane, the first catalyst layer including a number of clusters of the first catalyst material, and the number of clusters defining a number of void spaces therebetween having a volume of 1 nm$^3$ to 1 μm$^3$.

10. The fuel cell membrane electrode assembly of claim 9, wherein the first catalyst material includes pure Pt; a Pt-M alloy where M is a metal other than Pt; a platinum group member metal; an alloy of a platinum group member metal and a metal other than Pt; an alloy of platinum, a platinum group member metal, and a metal other than Pt; or combinations thereof.

11. The fuel cell membrane electrode assembly of claim 9, wherein the number of void spaces form an interface between the first graphene-based material layer and the first catalyst material and between the second graphene-based material layer and the first catalyst material.

12. The fuel cell membrane electrode assembly of claim 11, wherein the interface includes first wrinkled portions of the first graphene-based material layer and second wrinkled portions of the second graphene-based material layer.

13. The fuel cell membrane electrode assembly of claim 9, wherein one or more of the number of void spaces are filled with one or more conducting agents other than the first catalyst material.

14. The fuel cell membrane electrode assembly of claim 9, wherein a percentage of a void space of the number of void spaces to a volume occupied by the number of clusters of the first catalyst material is in a range of 25% to 60%.

15. The fuel cell membrane electrode assembly of claim 9, wherein the first graphene-based material layer having a first number of defects per unit volume of the first graphene-based material layer of 7 to 13%, and the second graphene-based material layer having a second number of defects per unit volume of the second graphene-based material layer of 0.5 to 6%.

16. A fuel cell membrane electrode assembly comprising:
a polymer electrolyte membrane; and first and second electrodes including first and second bulk materials, the polymer electrolyte membrane situated between the first and second electrodes, the first bulk material including a first number of catalyst units discretely dispersed therein, the catalyst units each comprised of a catalyst material layer including a catalyst material and having first and second surfaces and first and second material layers adjacent to the first and second surfaces, respectively, of the catalyst material layer, the first material layer of each catalyst unit comprised of a graphene-based material layer having a number of defects configured to mitigate dissolution of the catalyst material through the graphene-based material layer, the number of defects per unit volume of the graphene-based material layer is 0.5 to 13%, and a width of the first number of catalyst units is 10 nm to 100 μm, a length of the first number of catalyst units is 10 nm to 100 μm, and a thickness is 1 to 20 nm.

17. The fuel cell membrane electrode assembly of claim 16, wherein the second bulk material includes a second number of catalyst units dispersed therein, the first electrode is a cathode and the second electrode is an anode, and the first number is greater than the second number.

18. The fuel cell membrane electrode assembly of claim 17, wherein a ratio of the first number to the second number is in a range of 2:1 to 5:4.

19. The fuel cell membrane electrode assembly of claim 16, wherein the first bulk material is an ionomer forming an ionomer network between the first number of catalyst units.

20. The fuel cell membrane electrode assembly of claim 19, wherein the second material layer of each catalyst unit is a catalyst support layer of an amorphous carbon material, a metal oxide, or a combination thereof.

* * * * *